Jan. 15, 1952     F. B. ROMERO     2,582,563
MARINE BUSHING
Filed Feb. 14, 1946                                          2 SHEETS—SHEET 1
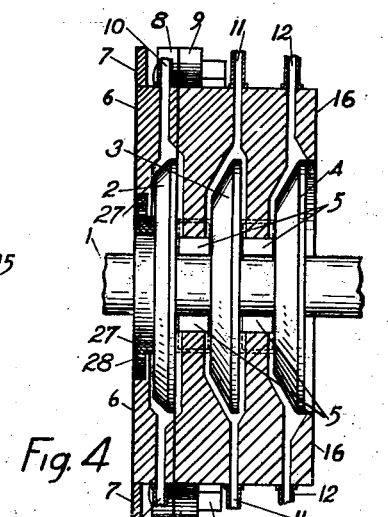
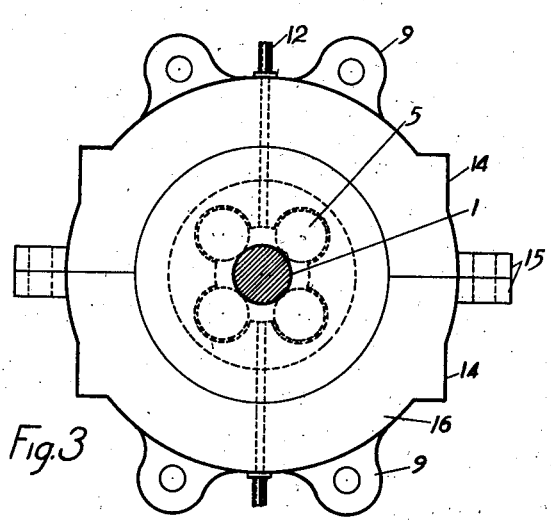
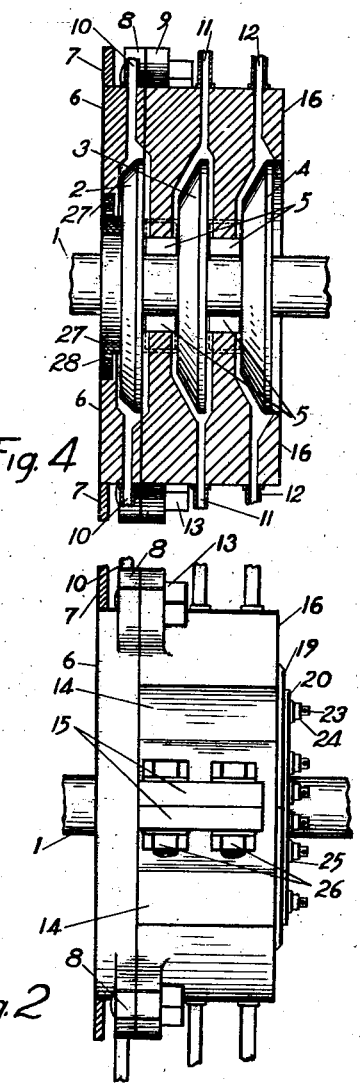
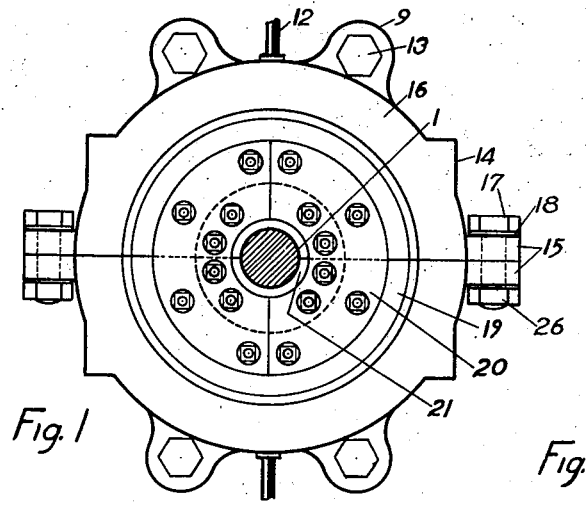
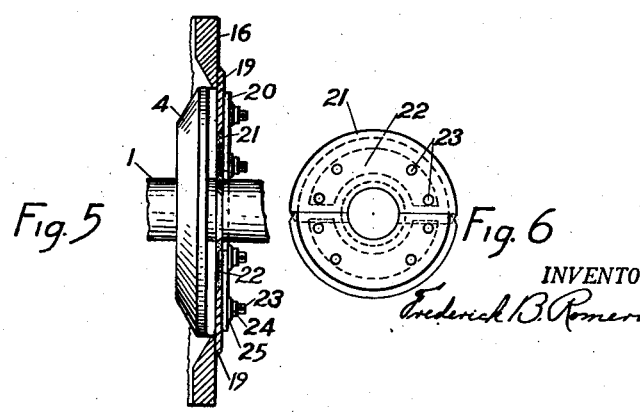
INVENTOR.
Frederick B. Romero

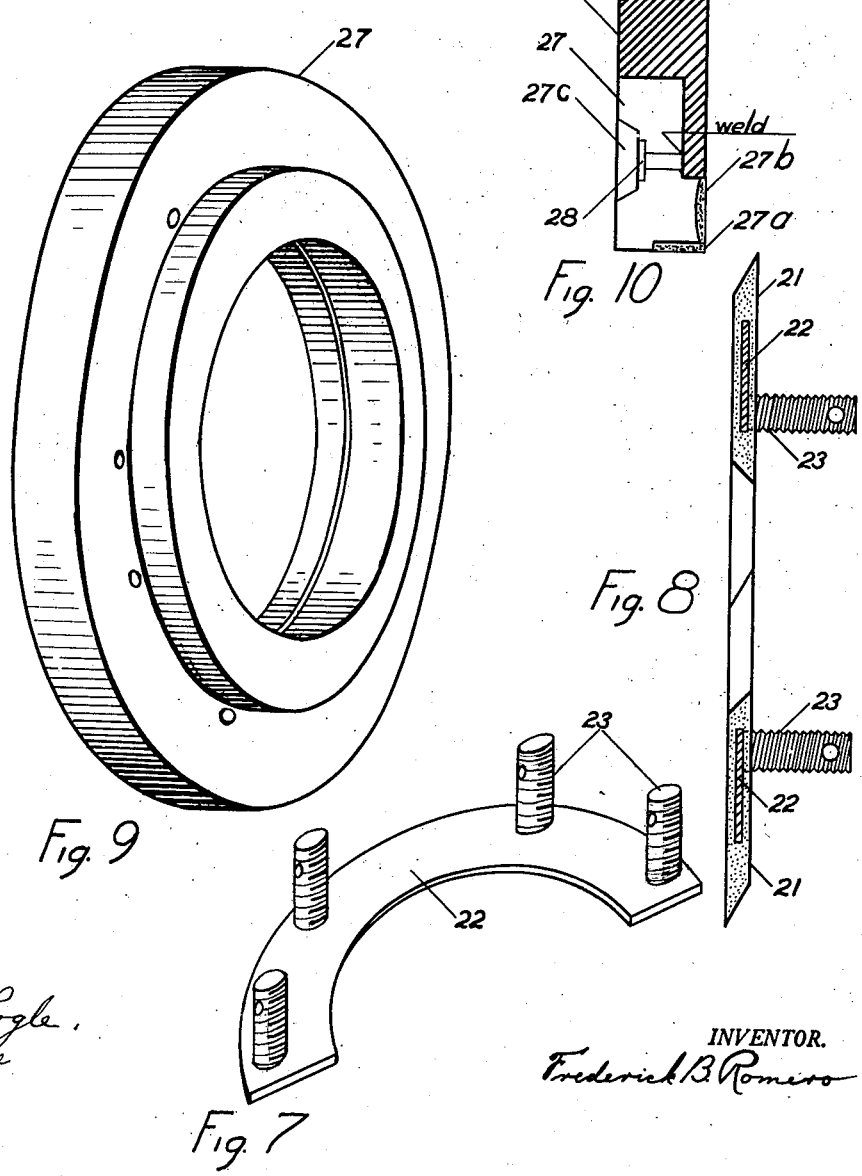

Patented Jan. 15, 1952

2,582,563

UNITED STATES PATENT OFFICE 2,582,563

MARINE BUSHING

Frederick B. Romero, Washington, D. C.

Application February 14, 1946, Serial No. 648,802

3 Claims. (Cl. 308—162)

This invention relates to bushings, especially marine bushings and of a type wherein, as shown the length is comparatively short. In the structure there are ducts making part of a lubricant circulatory system, which makes possible excellent lubrication of the closely approximated smooth surfaced parts and greatly reduces friction which is also considerably reduced by a cylindrical roller bearing system. These systems together with axle and axial flange members are enclosed within an overall case.

The objects of this invention include a marine bushing of the type set forth; wherein flange members together with cylindrical roller bearings adequately lubricated through a lubricant circulatory system, are made within an overall case, which is especially adaptable to newly invented boats revealed in applications of Ser. No. 162,523, filed May 17, 1950, and Ser. No. 775,442, filed September 22, 1947, Pat. No. 2,570,595, October 9, 1951, and Ser. No. 643,981, filed January 29, 1946, Pat. No. 2,539,756, January 30, 1951. This new type of bushing is also functionally related to a newly invented steam turbine revealed in application of Ser. No. 243,205, filed August 23, 1951, which is supplied steam by the newly invented steam generator shown in application of Ser. No. 756,346 filed June 19, 1947. The principal purpose of this new type of bushing is to eliminate frictional resistance and axial or shaft transverse vibration together with the elimination of the comparatively great length incurred by the use of the present day generally used marine bushings. A further object of this new type of bushing is to provide nearly absolute and permanent water-tightness at the junction of the vessel's hull shell and a high-speed revolving propeller driving shaft. A further object of the invention is generally to improve the construction of marine bushings of the type herewith set forth. These objects are attained by the mechanism illustrated in the accompanying drawings in which:

Fig. 1 is the inner end elevation view of the marine bushing.

Fig. 2 is a side elevation view of the marine bushing.

Fig. 3 is an inner end elevation view of the marine bushing with the inner end face plates removed.

Fig. 4 is a side elevation sectional view of the marine bushing's over-all case, and a side elevation view of the axle or shaft and its flanges and cylindrical bearings.

Fig. 5 is a side elevation sectional and partial view of the bushing.

Fig. 6 is a plan view of a disc-ring of the inner end of the bushing.

Fig. 7 is a perspective view of a part of one of the disc-rings of the inner end of the bushing.

Fig. 8 is an edge and sectional view of one of the disc-rings of the inner end of the bushing.

Fig. 9 is a perspective view of a wooden ring.

Fig. 10 is a cross-sectional view of a wooden ring and its fittings.

Inner end, in each statement above, refers to that end of the bushing which is always directed toward the driving machinery of the vessel. Similar numerals refer to similar parts throughout the several views, but not all the similar parts are numbered.

In the construction illustrated in the Figs. 1, 2, 3, 4, 5, 6, 7, 8, 9, and 10, as applied to a marine bushing, for which the invention particularly is intended, the marine bushing, is comprised of a plurality of fitted structures including an overall case made of three large pieces shown especially well by Figs. 1 and 2, wherein the ring piece 6, is to be made contiguous with the boat's shell plating 7, and held to the upper and lower pieces 16, at projecting flanges 8 and 9, by threaded bolts 13, the upper and lower pieces 16, also being held together at flanges 15, by bolts 17, washers 18, and nuts 26, besides the three large pieces namely, ring 6, upper casing piece 16, and lower casing piece 16, at the inner end of the case there is welded in place the horizontally divided disc-ring 19, to which are welded the threaded studs 23, obviously pierced, Fig. 2, at their distal ends to make holes into which fit cotter pins, and said threaded studs 23 receive washers 25 and nuts 24, which hold in place the vertically divided disc-ring 20, which holds in place the horizontally divided asbestos plastic disc-ring 21, in which is imbedded the sheet-metal pieces 22, Fig. 5, to which are welded threaded studs 23, which by use of the above indicated nuts 24, and washers 25, secure the asbestos plastic disc-ring into its proper place. The plurality of fitted structures of said marine bushing include also cylindrical bearings 5, shown in Figs. 3 and 4, there being a total of eight bearings 5.

Lubricating ducts shown clearly in Fig. 4, make possible the passage of oil into the central parts of the bushing. Outwardly said ducts are joined to the ends of lubricant circulating tubes 10, 11, and 12, shown in Figs. 1, 2, 3, and 4. On the water contacted end of the bushing, ring piece 6, is fitted centrally with a creosote soaked wooden ring 27, shown in Figs. 4, 9, and 10. The ring is held in place by eight flat-headed equidistantly placed countersunk studs 28, in which the proximal ends are welded to ring piece 6, and in which the distal ends are covered by wooden discs 27c glued into place and outwardly made flush to the surface of ring 27. The wooden ring's central surfaces approximating the rotating propeller shaft or axle, are fitted with asbestos felt gaskets. The gasket, contacting the axial enlargement outwardly extending from flange 2, occupies only the inner two thirds of the wooden ring's central thickness in which two thirds of said thickness is circumferentially enlarged to provide occupying space for the said gasket 27a, as shown in Fig. 10. Outwardly the wooden ring closely approximates the surface of the said axial enlargement. The gasket 27b occupies the innermost surface of the wooden ring and contacts the outer axial flange 2, as shown in Figs. 4 and 10. Gasket 27b completely covers the innermost surface of the wooden ring 27.

The bushing case upper and lower pieces 16, inwardly, are grooved to fit over flanges 2, 3, and 4, which are made structurally contiguous in their proper places on the shaft or axle 1, then machined and ground to make all surfaces smooth, as shown in Fig. 4, the proper structural contiguity occurs in a single casting made in a mold which simultaneously shapes the axle or shaft and its flanges. The bushing case is provided inwardly with sockets into which fit bearings 5, as shown in Figs. 3 and 4. In these figures it can be seen that the shaft or axle, is approximated by considerable space between its surface and the innermost central surfaces of the bushing case as seen between the bearings 5, in Fig. 3; said space is kept full of oil when the bushing is being utilized, and the oil is kept in slow circulation. Said asbestos plastic divided disc-ring 21, has its peripheral edges beveled 60 degrees, the central edges are beveled 45 degrees, it will be noticed (Fig. 6) that the peripheral edges of upper and lower halves are oppositely beveled, the purpose being to make the approximating edges as nearly oil-tight as possible in order to confine the oil to its containing space just behind the inner-end face plates 19, 20, and 21, which make possible inward inspection when occasionally removed. In Fig. 5, is shown a shallow circumferential axial groove into which fits the central edge of disc-ring 21, made to provide approximate oil-tightness. Said oil circulating tubes 10, 11, and 12, upper and lower are welded in their places on the case surfaces, and are provided with short transparent segments to make possible the observation of the presence or absence of oil. The cylindrical bearings 5, are forced by friction to revolve in their places as the axle or shaft rotates in an opposite direction. Flange members 3 and 4, are provided with 60 degree beveled outer edges which fit into their case grooves the surfaces of which are exactly opposite those of flange members 2, 3, and 4. Flange member 2 is provided with a 45 degree beveled edge. These said flanges fitted within their case sockets prevent transverse vibration of said shaft. Said marine bushing, when properly lubricated, makes possible high speed revolution or shaft or axial and propellers attached thereto, without any transverse vibration, and with a minimum of frictional resistance. Outwardly the bushing case upper and lower pieces 16, are cast so as to include in their structure, ledges or seats 14, which present surfaces perpendicular to the vertical and horizontal planes and thereby provide bearing surfaces for stiffeners which make possible the increased strength of bushing fixation in its proper position and elimination of otherwise excessive stresses and strains on the vessel's shell plating. The long edges of said seats 14, are parallel with the axis of the over-all case's enclosed axle or shaft, said axle or shaft is finished in any one of the several known and practiced ways for the purpose of making adequate end connections with such structures as the propeller and the propeller driving machinery.

I claim:

1. A marine axle or shaft bushing comprising a plurality of fitted structures, especially adapted to prevent inflowing of water under pressure as occurs below the load waterline of ships, said plurality of fitted structures including a triple flanged axle of shaft, said three flanges being separated by spaces occupied by a plurality of cylindrical bearings which are continuously accessible by way of a plurality of supplying ducts and draining ducts to a continuous circulation of fluid lubricant, said plurality of fitted structures including a three section encasement, said encasement having means adaptable to fixation in the vertical and horizontal planes by reinforcing structural members, said three section encasement being supplemented by a plurality of fitted detail structures providing nearly permanent absolute water tightness, in said marine axle or shaft bushing, all substantially as herewith set forth.

2. A marine axle or shaft bushing mechanism comprising a plurality of fitted structures, especially adapted to prevention of water inflow at the junction of the shell of a marine vessel and a high-speed rotating shaft where the water pressure of considerable weight exists below the load water-line of small boats and ships, said plurality of fitted structures including a triple beveled flanged axle or shaft, said three flanges being separated so as to become adaptable to the fitting of a plurality of cylindrical bearings, said bearings being partially sustained by closely fitting sockets wherein, axial rotation, induces bearing rotation, said bearings being lubricated in a constantly existing bath of fluid lubricant supplied by a plurality of ducts and forming part of a lubricant circulatory system, said plurality of fitted structures including a three section encasement for said triple beveled flanged shaft or axle, said triple section encasement being made adaptable for fixation in the shell of a marine vessel and by having ledge structures, being made adaptable for reinforcing members extending in both vertical horizontal planes from said marine axle or shaft bushings, all substantially as herewith set forth.

3. A marine axle or shaft bushing comprising a plurality of fitted structures, especially adapted for the prevention of water inflow at the junction of the hull's shell of a marine vessel and a high-speed rotating shaft where the water pressure of considerable weight exists below the load water-line of small boats and ships, said plurality of fitted structures including a triple beveled flanged axle or shaft, said three flanges being separated so as to be adaptable to the fitting of a plurality of cylindrical bearings, said bearings being partially sustained by closely fitting sockets made within said fitted structures which comprise a triple section encasement and fitted to the said triple flanged axle or shaft, said triple section encasement being constructed outwardly for the purpose of fixation at projected seats, and a ring piece of said bushing securing it inwardly of a marine vessel, said triple section encasement being supplemented by closely fitting detail structures inducing nearly permanent absolute water-tightness, in said marine axle or shaft bushing mechanism, all substantially as herewith set forth.

FREDERICK B. ROMERO.

REFERENCES CITED

The following references are of record in the file of this patent:

UNITED STATES PATENTS

| Number | Name | Date |
|---|---|---|
| 215,782 | Wilson | May 27, 1879 |
| 449,953 | Simonds | Apr. 7, 1891 |
| 466,438 | Simonds | Jan. 5, 1892 |
| 602,589 | Sellers | Apr. 19, 1898 |
| 624,497 | Inglis | May 9, 1899 |
| 806,389 | Anderson | Dec. 5, 1905 |
| 1,165,594 | Hani | Dec. 28, 1915 |
| 1,309,763 | McKennitt | July 15, 1919 |
| 1,462,366 | Kellogg | July 17, 1923 |